United States Patent
Mavier et al.

(10) Patent No.: US 7,436,686 B2
(45) Date of Patent: Oct. 14, 2008

(54) RECONFIGURABLE VOLTAGE INVERTER WITH TOLERANCE TO FAILURES

(75) Inventors: Jérôme Mavier, Toulouse (FR); Frédéric Richardeau, Flourens (FR); Hubert Piquet, Garrigues (FR)

(73) Assignees: Airbus France, Toulouse (FR); Centre National de la Recherche Scientifique, Paris (FR); Institut National Polytechnique de Toulouse, Toulouse (FR)

( * ) Notice: Subject to any disclaimer, the term of this patent is extended or adjusted under 35 U.S.C. 154(b) by 196 days.

(21) Appl. No.: 11/543,106

(22) Filed: Oct. 5, 2006

(65) Prior Publication Data

US 2007/0086226 A1    Apr. 19, 2007

(30) Foreign Application Priority Data

Oct. 13, 2005    (FR) .................................. 05 53116

(51) Int. Cl.
*H02M 3/24*    (2006.01)
(52) U.S. Cl. ........................ 363/95; 363/96; 363/56.01; 363/57
(58) Field of Classification Search .............. 363/56.01, 363/95, 96, 57
See application file for complete search history.

(56) References Cited

U.S. PATENT DOCUMENTS 5,990,654 A * 11/1999 Skibinski et al. ............ 318/800

OTHER PUBLICATIONS

Brian A. Welchko, et al., "Fault Tolerant Three-Phase AC Motor Drive Topologies; A Comparison of Features, Cost, and Limitations", Electric Machines and Drives Conferences, 2003., vol. 1, XP-010644859, Jun. 1, 2003, pp. 539-546.

R. L. A. Ribeiro, et al., "Compensation Strategies in the PWM-VSI Topology for a Fault Tolerant Induction Motor Drive System", Symposium on Diagnostics for Electric Machines, Power Electronics and Drives, XP-010659931, Aug. 24-26, 2003, pp. 211-216.

Sangshin Kwak, et al., "A Matrix Converter for Fault Tolerant Strategies and Two-Phase Machine Drives", IECON-2002. Proceedings of the 28th. Annual Conference of the IEEE Industrial Electronics Society, vol. 1 of 4, conf. 28, XP-010633166, Nov. 5, 2002, pp. 251-256.

N. Ertugrul, et al., "Investigation of a Fault Tolerant and High Performance Motor Drive for Critical Applications", Institute of Electrical and Electronics Engineers, vol. 2 of 2, XP-001054005, Aug. 19, 2001, pp. 542-548.

* cited by examiner

*Primary Examiner*—Shawn Riley
(74) *Attorney, Agent, or Firm*—Oblon, Spivak, McClelland, Maier & Neustadt, P.C.

(57) ABSTRACT

Voltage inverter provided with four switching cells (Q1 to Q4) to be connected to the terminals of a DC voltage source (Vdc), each comprising two semiconductor switches (I11, I12, I21, I22, I31, I32, I41, I42) installed in series, these switches having a common point (A0) to be connected to an AC current source (Mac) with three phases (p1, p2, p3) and a neutral (n), the connection being made onto one phase (p1, p2, p3) for three of the cells (Q1, Q2, Q3) and onto the neutral (n) for the fourth cell (Q4). Each cell (Q1 to Q4) cooperates with a semiconductor electrical isolating device (S1, (S2.1 and S2.2)) to be put into a turn-off state if the cell should fail, this isolating device (S1, (S2.1 and S2.2)) being arranged either on the connection to the AC current source (Mac), or on connections to the terminals of the DC voltage source (Vdc).

20 Claims, 8 Drawing Sheets

RECONFIGURABLE VOLTAGE INVERTER WITH TOLERANCE TO FAILURES

TECHNICAL DOMAIN

This invention relates to a reconfigurable voltage inverter with tolerance to failures. Such a device is designed to convert a DC voltage into one or several AC voltages, and is reversible in power.

Such an inverter can be used particularly in aeronautical applications in which safety and reliability are of overriding importance. Such an inverter must be able to continue to operate despite the presence of one or several failures internal to its operation, provided that it is reconfigured.

The development towards increasingly <<electric>> aircraft leads to the development of electronic power systems for the treatment of electrical energy within onboard energy networks.

In the case of the A380 aircraft made by the Airbus company, the onboard electrical network has variable frequency and a large number of actuators cooperate with synchronous electrical machines with permanent magnets powered by voltage inverters.

STATE OF PRIOR ART

We will describe this prior art in a configuration in which the inverter does a DC to AC conversion. An AC to DC conversion is also possible because the inverter is reversible in power.

Such a conventional voltage inverter is connected to the terminals of a DC voltage source or a DC bus and it transforms this DC voltage into an AC voltage to supply a three-phase alternating current source. This alternating current source may be a three-phase machine using alternating current, such as a synchronous machine with permanent magnets or a three-phase power supply network. A conventional voltage inverter comprises three electrical switching cells or arms, each cell comprising two semiconductor switches connected in series to the DC voltage source. For each of these three cells, the common point of the switches is connected to one phase of the three-phase alternating current source.

The switch is usually formed from a diode and a transistor in an antiparallel circuit.

It is known that a fourth standby cell also with two switches and the same series connection to the DC voltage source can be added to the inverter, in order to improve the operating safety of such inverters. The common point of the switches is connected to the neutral of the AC current source. The fourth cell may remain inactive during normal operation. This fourth cell will be activated in the case of a failure of one or two of the other three cells. A failure in one cell may originate in the switch semiconductor or their controls.

For example, publications [1], [2], [3], for which the complete references are given at the end of the description, are known. They describe details of voltage inverters that tolerate failures and enable operating continuity following a failure. When a failure is detected, the cell concerned will be isolated and the fourth standby cell will be made active, if is it not the cell concerned by the failure.

The two documents [1], [2] propose that the series connection of switches onto the DC voltage source should be done using a fuse possibly associated with a thyristor and a capacitor installed in series. Therefore one of the ends of each of the two fuses is connected to one of the terminals of the DC voltage source and the other end is connected firstly to one of the semiconductor switches and secondly to the other terminal through one of the thyristors and one of the capacitors.

In the case of a failure in a semiconductor switch, ignition of the thyristor associated with it enables the fuse in series with the failed switch to burn out, isolating the failed cell from the DC voltage source. The fourth standby cell is then put into active mode.

Fuses are passive components with many disadvantages that make then undesirable particularly in onboard applications.

They are triggered within a fairly wide range of currents, so that the electrical isolation of the defective cell is not well controlled.

Once they have burned out, they have to be replaced. They may well be difficult to access in aeronautical applications. In all cases, they require restrictive maintenance.

An electrical arc may occur when an overcurrent is applied to them, which is unacceptable in many applications and particularly in aeronautical applications.

The fact that the fuse is made to cooperate with a thyristor makes management of the energy from the DC voltage source difficult. In case of failure, the two thyristors are turn-on (conducting) and the capacitors discharge into the fuses. A large amount of energy is necessary to burn out the fuses, and this energy is drawn off from the DC voltage source.

PRESENTATION OF THE INVENTION

The purpose of this invention is to propose a voltage inverter tolerant to failures that does not have the disadvantages mentioned above.

One particular purpose of the invention is to propose such a voltage inverter that is capable of maintaining its initial functions, despite the presence of one or several failures on one or two of its dells, by reconfiguring its control. The internal safety and functional availability of such a voltage inverter are better than for conventional voltage inverters.

Another purpose of the invention is to propose a voltage inverter that only requires low maintenance.

Another purpose of the invention is to propose a voltage inverter that can detect and isolate one or several internal failures.

Another purpose of the invention is to propose a compact voltage inverter.

In order to achieve these purposes, the invention relates more particularly to a voltage inverter with four switching cells to be connected to the terminals of a DC voltage source, each comprising two semiconductor switches installed in series, these switches having a common point to be connected to an AC current source with three phases and a neutral, the connection being made onto one phase for three of the cells and onto the neutral for the fourth cell. Each of the four cells cooperates with a semiconductor electrical isolating device to be put into a turn-off (blocked) state if the cell should fail. This isolating device is arranged either on the connection to the AC current source, or on connections to the terminals of the DC voltage source.

The electrical isolating device may have a controllable electronic switch function that is bi-directional in current and in voltage.

When the electrical isolating device is arranged on the connection to the AC current source, this electrical isolating device may comprise at least two parts in an antiparallel circuit. Each part may comprise a transistor and a diode in series.

When the electrical isolating device is arranged on the connection to the AC current source, as a variant each part may be formed from a thyristor.

When the electrical isolating device is arranged on the connections to the terminals of the DC voltage source, the electrical isolating device may include at least two thyristors installed in antiparallel on each connection.

A diode and a thyristor can be used installed in antiparallel instead of the two thyristors.

The isolating device may include at least one diode and one transistor installed in antiparallel on each connection, instead of the diode and the thyristor installed in antiparallel.

As a variant, at least two assemblies could be provided each having one diode and one transistor installed in series, these two assemblies being mounted in antiparallel.

It is preferable that the thyristors or transistors are mounted in series with a filter device.

The filter device is preferably of the inductive capacitive type.

It is preferable that a protection device should cooperate with the electrical isolating device.

This protection device may advantageously comprise at least one transit diode in parallel with the electrical isolating device.

The switch of a cell may comprise a transistor and a diode in an antiparallel circuit.

It is preferable if this switch is provided with a protection device.

Each cell may cooperate with a failure monitoring and control device specific to it.

When the monitoring and control device detects failure of one of the three cells, it forces the switches of this cell and the electrical isolating device associated with it into a turn-off state.

The monitoring device cooperates with a supervisor device included in the inverter that puts the fourth cell into operation when the monitoring and control device detects a failure in one of the three cells, and puts the electrical isolating device associated with the fourth cell into a turn-on state.

The monitoring and control device can cooperate with a current measurement device placed on the connection to the AC source.

The monitoring and control device can also cooperate with a switch temperature measurement device.

BRIEF DESCRIPTION OF THE FIGURES

This invention will be better understood after reading the description of example embodiments given for guidance only and in no way limitative, with reference to the appended figures, wherein.

Identical, similar or equivalent parts of the different figures described below have the same numeric references to facilitate comparison of one figure with another.

The different parts shown on the figures are not necessarily shown at a consistent scale, to make the figures more easily readable.

DETAILED PRESENTATION OF PARTICULAR EMBODIMENTS

Figure 1A:
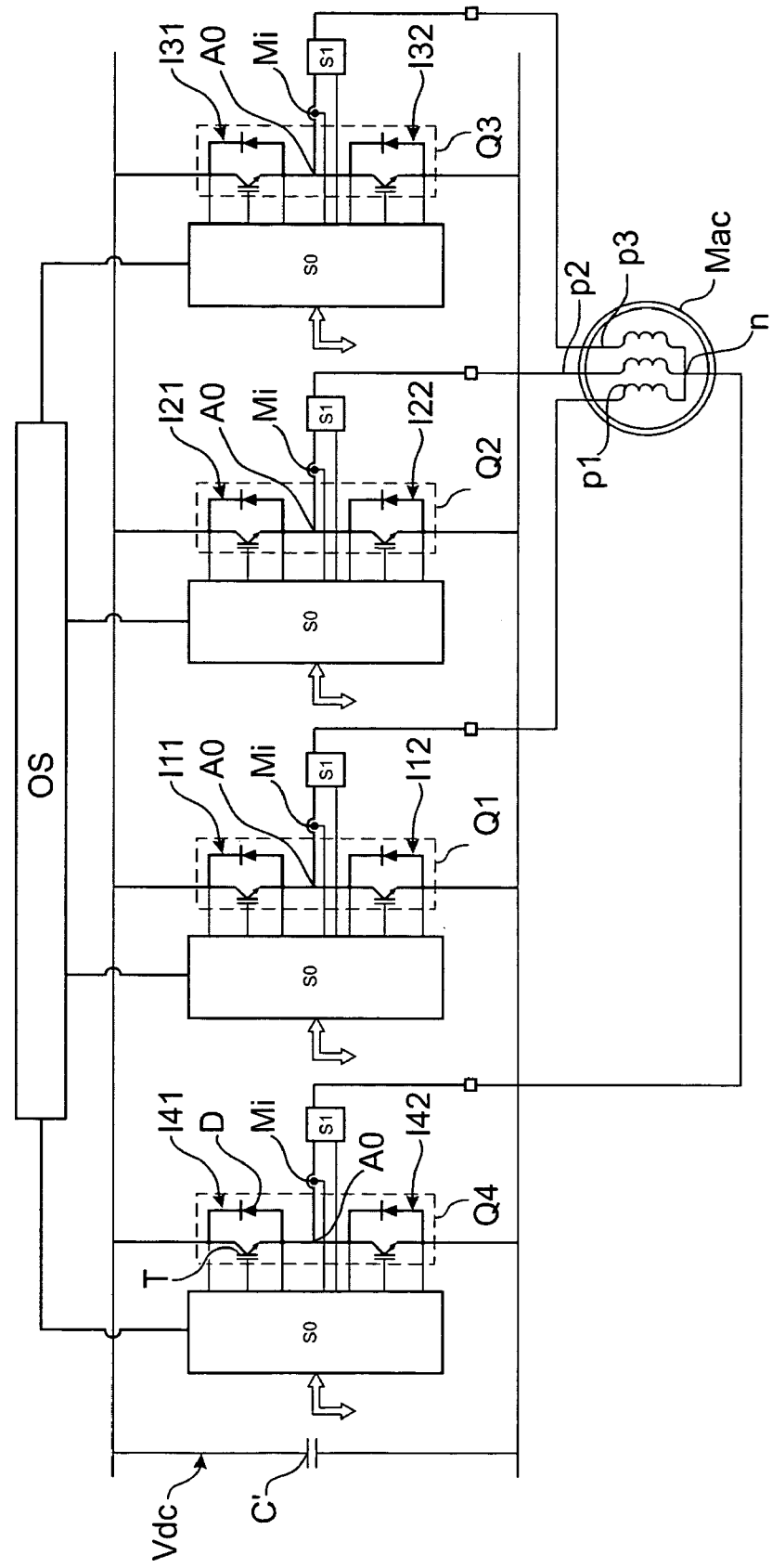
FIGS. 1A and 1B show two example embodiments of a voltage inverter according to the invention.
Figure 1B:
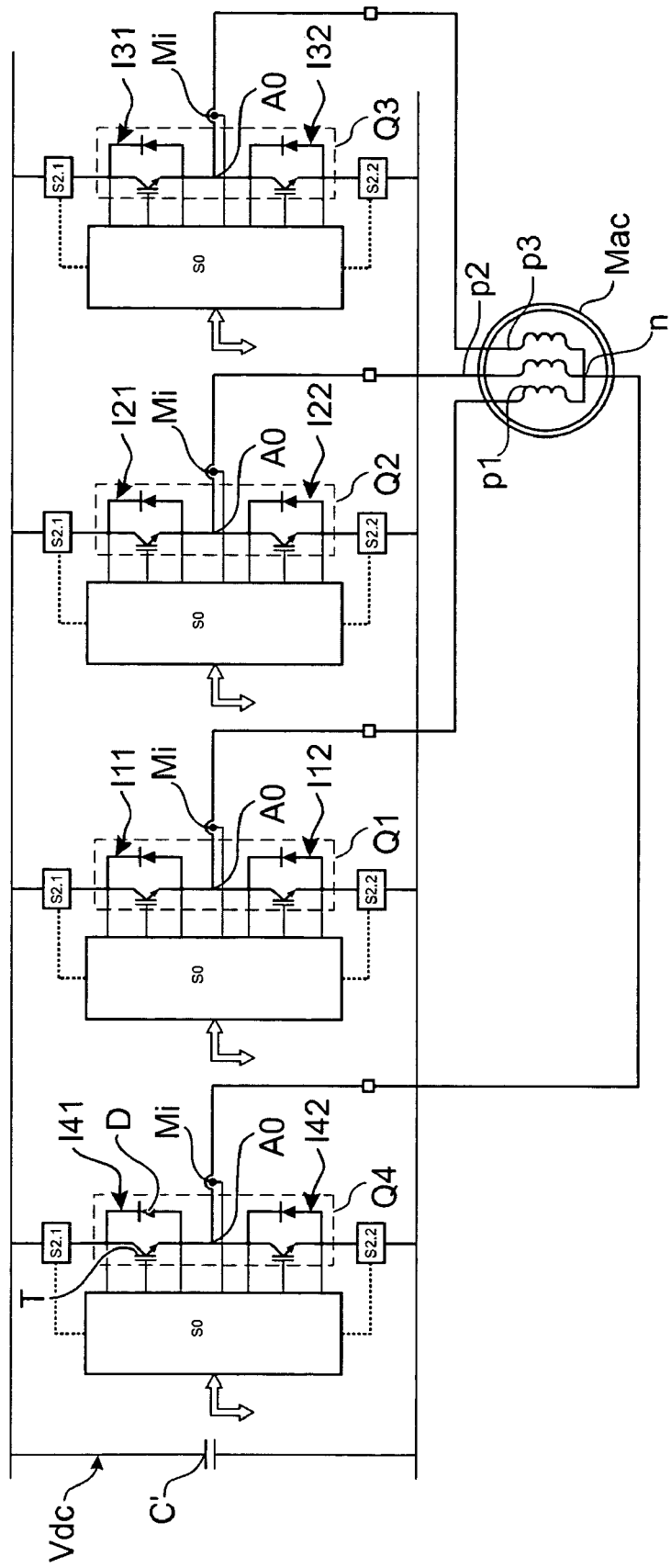

We will now refer to FIGS. 1A, 1B that diagrammatically show examples of three-phase voltage inverters according to this invention.

These voltage inverters are designed to modulate electrical energy exchanged between two electrical energy sources, one of which is a DC voltage source Vdc and the other is a three-phase AC current source Mac. Such inverters may be two-directional in power.

The voltage inverter conventionally comprises four switching cells Q1, Q2, Q3, Q4, each consisting of two semiconductor switches (I11, I12), (I21, I22), (I31, I32), (I41, I42). The two semiconductor switches in each of these cells Q1, Q2, Q3, Q4 are mounted in series. The cell is designed to be connected to the terminals of the DC voltage source Vdc. The voltage source Vdc is materialized by a DC voltage bus. The reference C' represents a capacitor of the DC voltage bus Vdc.

The switches I11, I12, I21, I22, I31, I32, I41, I42 are static and can be made in an antiparallel circuit with a diode D and a transistor T. The two transistors T of a cell, and the two diodes D of the same cell, are installed in the same direction.

The two switches I11, I12, I21, I22, I31, I32, I41, I42 on each of the cells Q1, Q2, Q3, Q4 have a common point A0 that will be connected to the three-phase alternating current source Mac.

The three-phase alternating current source Mac comprises three phases p1, p2, p3 and a neutral n. It is materialized on FIGS. 1A, 1B by three windings installed in star configuration, the neutral n been the common point of the star. The three-phase alternating current source Mac may be made by a three-phase alternating current machine, for example a synchronous machine with permanent magnets. The voltage inverter is then capable of adjusting the operating point of the machine.

As a variant, the three-phase alternating current source Mac may be a three-phase power supply network. The voltage inverter then performs an active rectifier function.

Among the four switching cells Q1, Q2, Q3, Q4 of the inverter, three of them Q1, Q2, Q3 will each be connected to one of the phases of the alternating current source Mac, namely p1, p2, p3 respectively. The fourth cell Q4 will be connected to the neutral n of the alternating current source Mac. The fourth cell Q4 plays a standby role for when one or two of the cells Q1, Q2, Q3 to be connected to the phases of the alternating current source Mac fails. The fourth cell Q4 is inactive during normal operation of the voltage inverter, in other words its switches I41, I42 are uncontrolled if there is no failure and are in a turn-off state. The fourth cell Q4 is in waiting mode. When a reconfiguration is made after a failure has been detected, the defective cell is isolated and the fourth standby cell Q4 is then put into active mode, its switches I41, I42 are controlled so as to be made alternatively turn-on and turn-off during appropriate times.

According to the invention, each of the switching cells Q1, Q2, Q3, Q4 cooperates with an electrical semi conducting isolating device S1 or (S2.1 and S2.2) that is put into a turn-off state when a failure occurs in cell Q1 to Q4 with which it cooperates and that is in a turn-on state during normal operation.

During normal operation, the electrical isolating device S1 or (S2.1 and S2.2) in each of the three cells Q1 to Q3 connected to the phases of the three-phase alternating current source Mac is kept in the turn-on state. The electrical isolating device S1 or (S2.1 and S2.2) of the fourth cell Q4 connected to the neutral is in the turn-off state.

A defective cell Q1 to Q3 is isolated by putting its electrical isolating device S1 or (S2.1 and S2.2) into the turn-off state. When the fourth cell Q4 is in active mode, its electrical isolating device S1 or (S2.1 and S2.2) is in the turn-on state.

If the switches I41, I42 of the fourth cell Q4 are kept in a turn-off state during normal operation, it is advantageous to keep the electrical isolating device S1 or (S2.1 and S2.2) associated with it in a turn-off state.

In the example shown in FIG. 1A, the electrical isolating device S1 is inserted between the common point A0 to the two switches of a cell and the three-phase alternating current source Mac.

In the example shown in FIG. 1b, the electrical isolating device is broken down into two elements S2.1, S2.2, each inserted between one of the switches I11, I12, I21, I22, I31, I32, I41, I42 and one of the terminals of the DC voltage source Vdc.

The voltage inverter according to the invention also comprises a close-up monitoring and control device S0 of the cell with which it is associated, cooperating with each of the cells Q1, Q2, Q3, Q4. This device S0 is specific to the cell Q1, Q2, Q3, Q4 with which it cooperates. During normal operation, the switches I11, I12, I21, I22, I31, I32, of cells in active mode Q1, Q2, Q3 are in opposite states, one being turn-on and the other turn-off. The switches I41, I42 of the fourth standby cell are turn-off. When a failure is detected in one cell, its switches are forced onto a turn-off state. These controls are made by the monitoring and control device S0 of the cell. The electrical isolating device S1, (S2.1 and S2.2) is also controlled by the monitoring and control device S0 of the cell to put it in the turn-off state when a failure occurs in the cell with which it is associated. Association of a monitoring and control device S0 and an electrical isolating device of a cell performs an electronic circuit breaker function with regard to the cell.

The monitoring and control device S0 also cooperates with a current measurement device Mi inserted in the connection to the alternating current source. The measurement output from this current measurement device Mi enables the monitoring and control device S0 firstly to monitor and control the current in the three-phase alternating current source Mac, and secondly to synchronize the electrical isolating devices when a blockage occurs so as to minimize stresses related to blockage.

It also cooperates with a measurement device Mv to measure the maximum collector-emitter voltage Vcesat at the terminals of each of the switches of the cell when the transistor making up the switch is saturated. This measurement device Mv detects the failure of a switch in a cell due to the semiconductor or an unwanted control order. This latter device Mv is shown on FIG. 2B only for reasons of clarity.

The monitoring and control device S0 can also cooperate with a temperature measurement device Mt for measuring the temperature close to switches I11, I12, I21, I22, I31, I32, I41, I42 of cells Q1 to Q4. For example, the temperature may be measured at the protection box of these switches. This temperature measurement device Mt is outlined on FIG. 2A for reasons of clarity only.

The monitoring and control device S0 may also control the power supply voltage +V, −V applied to it.

The monitoring and control device S0 uses the data that it receives from voltage measurement, current measurement and temperature measurement devices to detect and diagnose any fault in the cell with which it is cooperating. The fault may be a short circuit type fault in one or both switches in the cell or on the other hand it may be an open circuit type fault in one or both switches in the cell. These faults may originate from a failure of the switch control by the monitoring and control device S0. Another cause of failure is an internal failure in one or both switches I11, I12 of the cell, for example by the critical temperature of a semiconductor junction being exceeded following an avalanche state, by excessive current density. Yet another cause of failure of the cell is a prolonged overcurrent in the connection to the three-phase alternating current source.

When a monitoring and control device S0 has detected and diagnosed a failure in the cell associated with it, for example Q1, it forces its switches I11, I12 to the turn-off state and it forces the associated electrical isolating device S1, (S2.1 and S2.2) to the turn-off state. It also sends a status signal to a supervising device OS (not shown on FIG. 1A) with which it communicates. This supervising device OS is a part of the inverter. The measurement results are also sent to the supervising device OS. All monitoring and control devices S0 communicate with this supervising device OS that in particular will manage reconfiguration of the voltage inverter by sending logical control orders to monitoring and control devices S0 of the other cells with no fault and particularly to the monitoring and control device S0 of the fourth cell Q4, the standby cell, to change it from the waiting state to the active state. Therefore, each monitoring and control device S0 locally manages safety and reconfigurations in the inverter according to this invention.

Reconfiguration of the inverter in the case of failure means operation different from the operation that takes place in normal mode, when there is no failure. This operation in standby mode is degraded but acceptable as will be seen later.

In summary, when the monitoring and control device detects a failure in one cell among the three cells Q1, Q2, Q3, the supervisor device OS starts operation of the fourth cell Q4 and changes the state of the electrical isolating device S1, (S2.1 and S2.2) associated with the fourth cell Q4, to put it into the turn-on state.

At a cell, for example Q1, cooperation of the electrical isolating device S1, (S2.1 and S2.2) and the monitoring and control device S0 is a means of confining the fault and blocking the complete associated cell Q1 that is defective.

It is preferable to provide protection devices Pi, Pi', Pi" for each of the switches I11, I12, I21, I22, I31, I32, I41, I42, in each of the electrical isolating devices S1 connected to the three-phase alternating current source Mac and each of the electrical isolating devices S2.1 and S23.2 connected to the DC voltage source Vdc. These protection devices Pi, Pi', Pi" evacuate the energy dissipated during the change from the turn-on state to the turn-off state of the switches or the isolating devices.

Each protection device Pi of the switches I11, I12, I21, I22, I31, I32, I41, I42 is for example formed from a series assembly formed from a two-directional transit diode DT and a resistance R, the assembly being mounted in parallel at the terminals of the switch that it protects; the common point between the transit diode DT and the resistance R is connected to the switch control. In the examples illustrated, it is the gate of the IGBT transistor T. The transit diodes are known for their overvoltage protection role. Two of these protection devices Pi are shown on FIGS. 2A, 2B and 3.

The protection devices Pi' of the electrical isolating devices S1 when they are connected to the three-phase alternating current source Mac, will be described later at the same time as the electrical isolating devices S1.

The same is true for protection devices Pi" connected to the isolating devices S2.1 and S2.2 connected to the DC voltage source Vdc.

We will now describe details of two possible configurations for the electrical isolating device S1 to be connected to the three-phase alternating current source Mac.

Figure 2A:
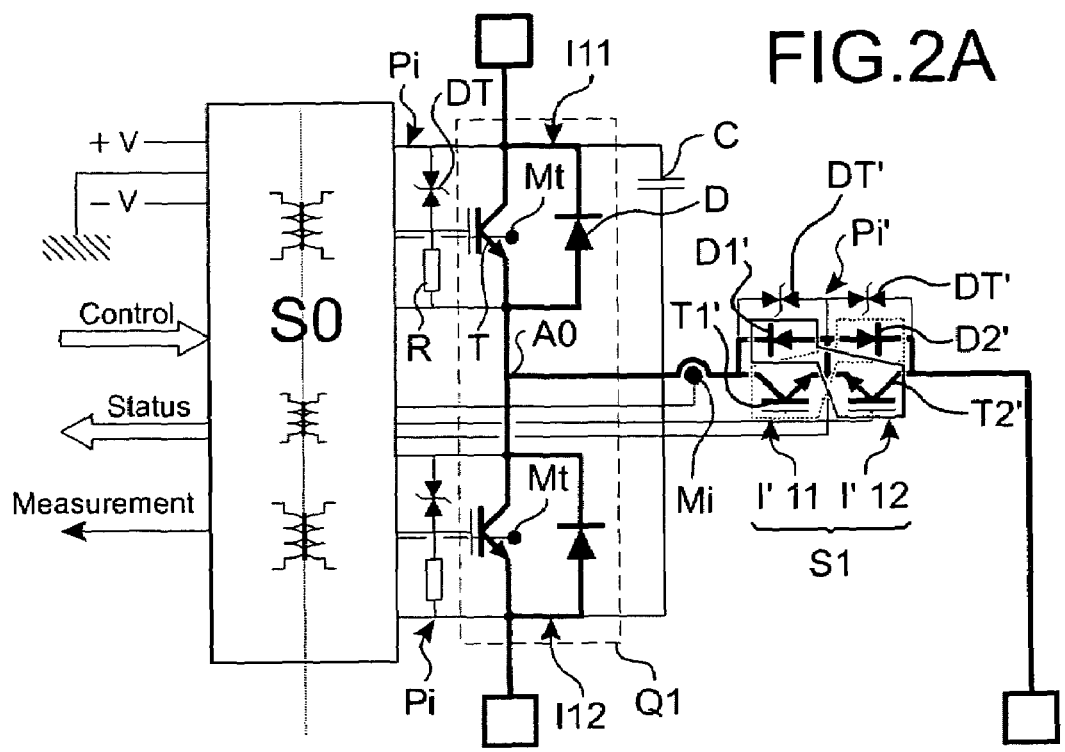
FIGS. 2A, 2B show two example embodiments of an electrical isolating device cooperating with a switching cell of the inverter according to the invention.
Figure 2B:
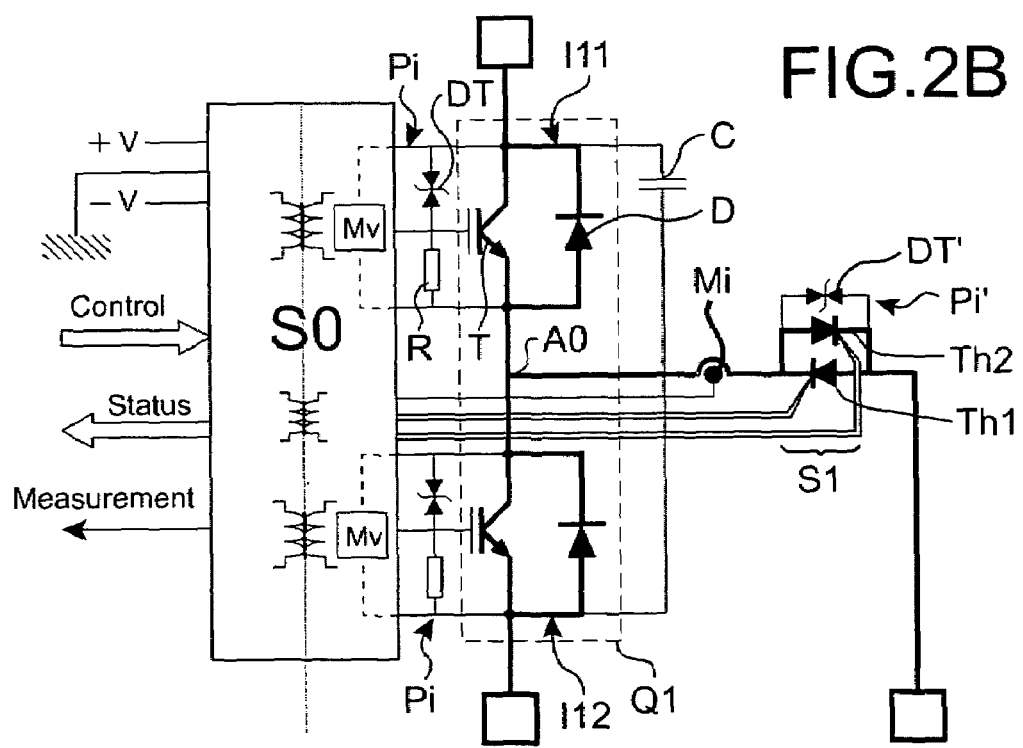

Refer to FIGS. 2A, 2B.

The electrical isolating device comprises two parts I'11, I'12 of the semiconductor switch type.

On FIG. 2A, the two switches I'11, I'12, are mounted in antiparallel. Each of the switches is formed by a series circuit with a diode and a transistor. These are diode D2' and transistor T1' for switch I'11 and diode D'1 and transistor T'2 for switch I'12. The cathodes of transistors T'1, T'2 are advantageously connected together. The control electrode of each transistor T'1, T'2 is connected to the monitoring and control device S0 associated with the cell concerned.

For each switch I'11, I'12 in the pair, the protection device Pi' consists of a two-directional transit diode DT' installed in parallel with the transistor T'1, T'2 of the switch I'11, I'12 that it protects.

This configuration enables electrical isolation of the cell Q1 even if the fault current circulating in the three-phase alternating current source is considered to be dc, in other words it does not cancel itself out. However, this configuration is characterized by non-negligible conduction losses due to the use of transistors T'.

In one variant illustrated on FIG. 2B, the switches are thyristors Th1, Th2 installed in antiparallel. The trigger-gate of each thyristor Th1, Th2 is connected to the monitoring and control device S0 associated with cell Q1. The protection device Pi' is formed by a two-directional transit diode DT' installed in parallel with the electrical isolating device S1.

This configuration can only be used if the fault current circulating between the voltage source and the three-phase alternating current source is intermittent, in other words if it cancels itself out. Otherwise, an adapted control of the other three switching cells can satisfy this condition. This case is quite realistic in the presence of an alternating current source. Conduction losses are significantly lower than in the previous case due to the use of thyristors. However, the immunity of the control against fast variations of potential on the control electrode is less than the immunity of the variant with transistors, due to the physical structure of the thyristor that is a memory effect component.

We will now describe details of an embodiment of an isolating device S2.1, S2.2 to be connected to the DC voltage source, with reference to FIGS. 3A to 3D.

The isolating device is broken down into two isolating elements S2.1, S2.2, one S2.1 being inserted between one of the switches I11 and one of the terminals of the DC voltage source Vdc, and the other S2.2 being inserted between the other switch I12 and the other terminal of the DC voltage source Vdc.

Figure 3B:
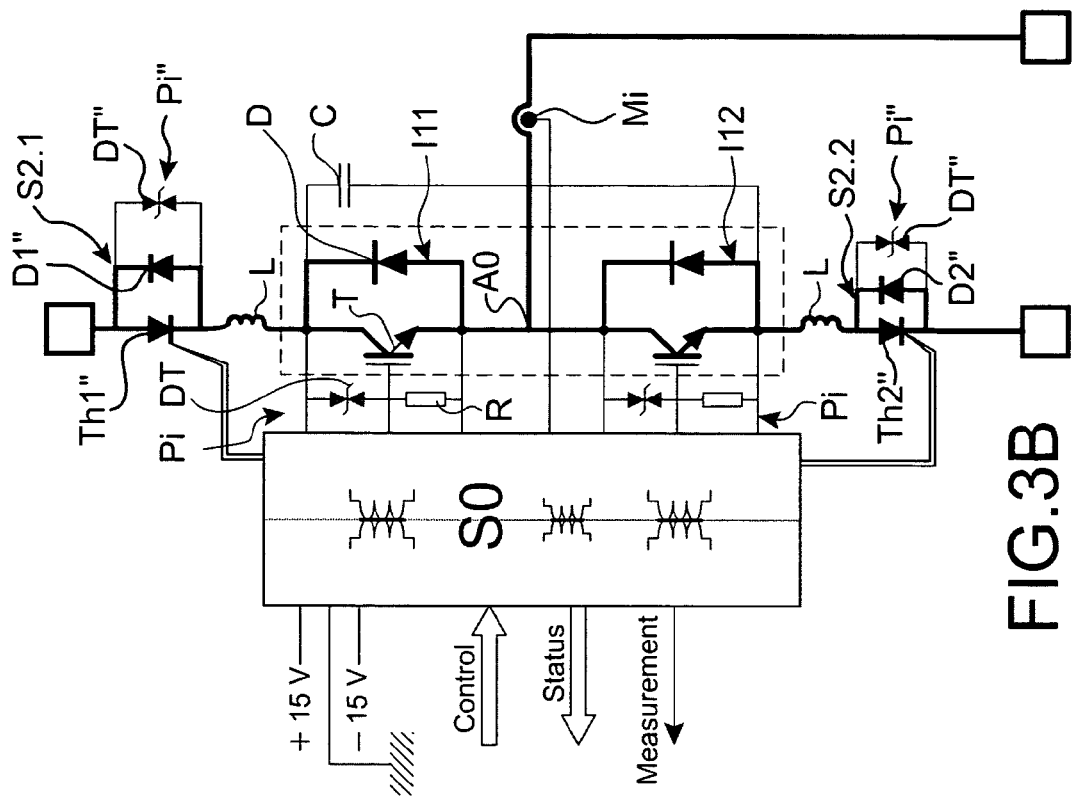
FIGS. 3A to 3D show four other example embodiments of an electrical isolating device cooperating with a switching cell of the inverter according to the invention.
Figure 3A:
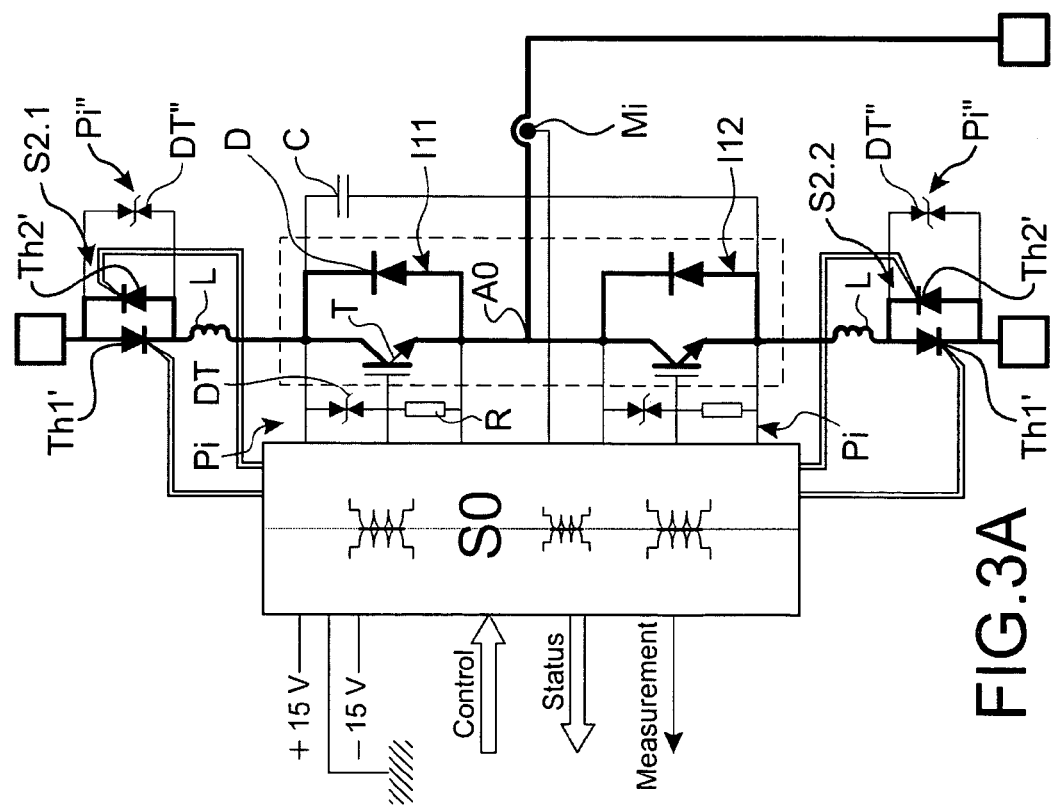
Figure 3D:
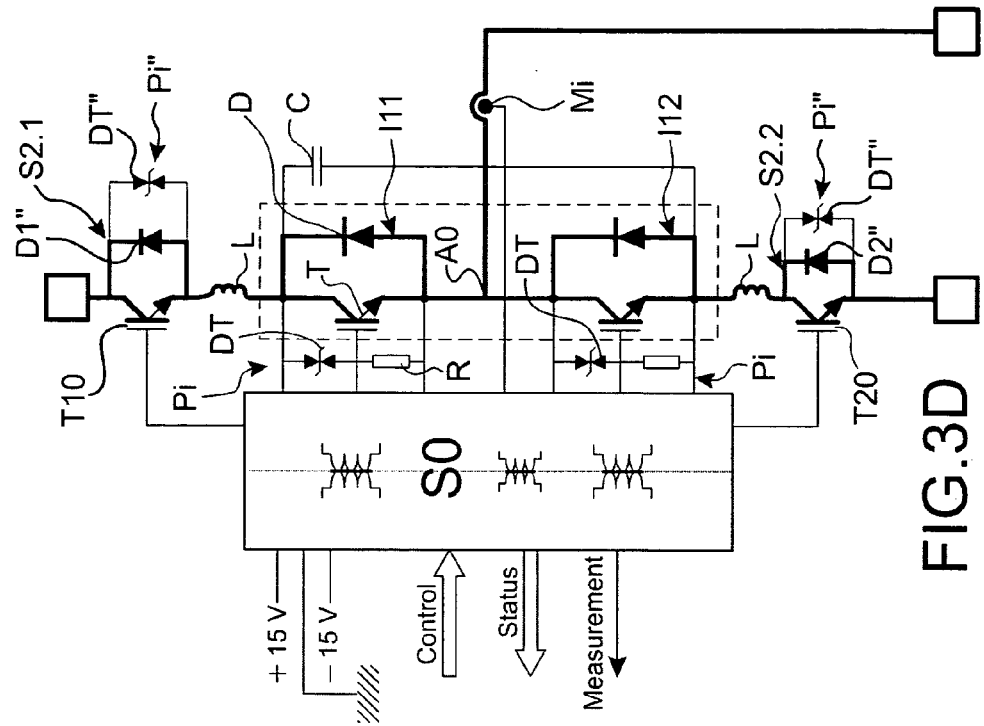
Figure 3C:
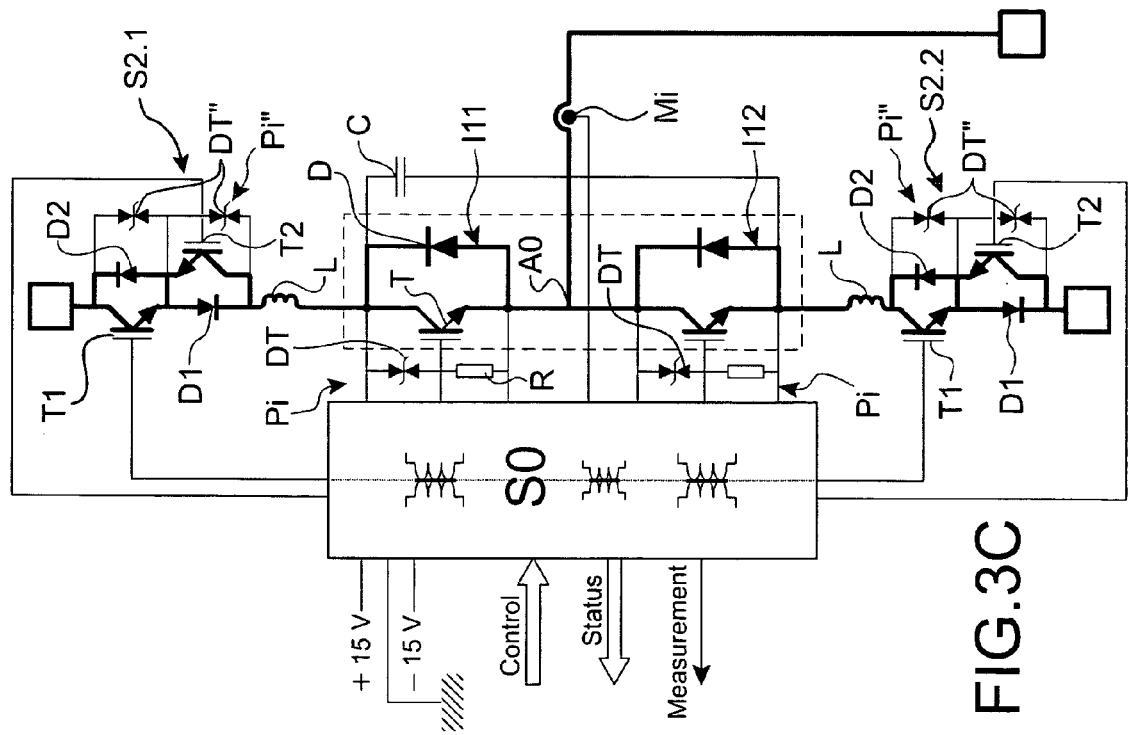

Each of the isolating elements S2.1, S2.2 comprises two thyristors Th1', Th2' that cooperate in an antiparallel circuit up on FIG. 3A. Each of the isolating elements S2.1, S2.2 comprises a thyristor Th1", Th2" and a diode D1", D2" that cooperate in an antiparallel circuit on FIG. 3B. The thyristor could be replaced by a transistor T10, T20 as shown on FIG. 3D. As a variant, each of the isolating elements S2.1, S2.2 comprises two assemblies each formed from a transistor T1, T2 and a diode D1, D2, the two assemblies being installed in antiparallel. It is preferable to install an inductive capacitive type filter device LC in series with each of the isolating elements S2.1, S2.2. In the two configurations in FIGS. 3A to 3D, there is an inductance L for each isolating element S2.1, S2.2 and a common capacitor C for each of the two isolating elements S2.1, S2.2. The capacitor C is installed in parallel with the pair of switches in each cell Q1 to Q4.

The protection device Pi" may be one or several two-directional transit diodes DT" installed in parallel with components of each isolating element S2.1, S2.2.

This configuration can give better control immunity than in the case in FIG. 2B because one of the two electrodes of switches S2.1, S2.2 is connected to a potential that only varies slightly, which is the potential of the DC voltage source.

Figure 4A:
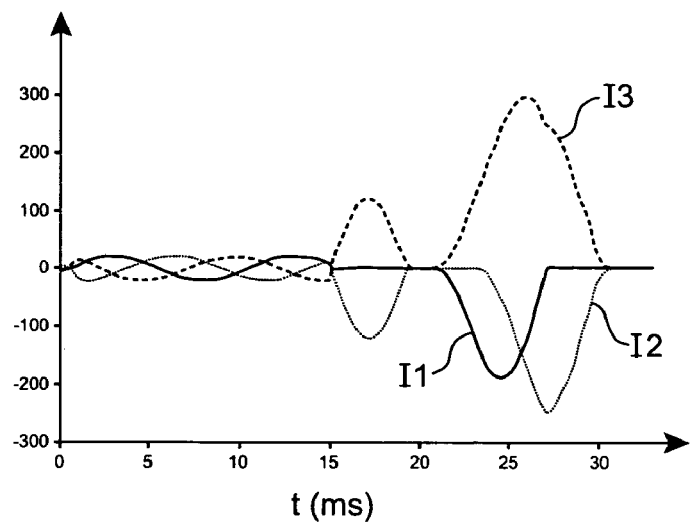
FIG. 4A shows the currents output by a three-phase voltage inverter in the presence of a failure.
Figure 4B:
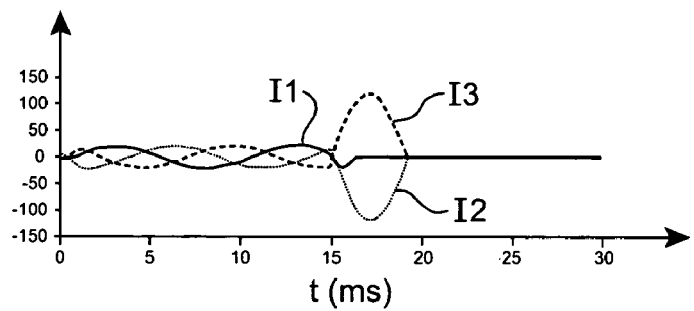
FIG. 4B shows the currents output by the voltage inverter after reconfiguration, FIG. 4C representing the control applied to the electrical device for isolating the defective switching cell of the inverter during the reconfiguration.

FIGS. 4A, 4B show the three currents I1, I2, I3 in amperes output by the voltage inverter according to the invention, and passing in the connections to the three-phase alternating current source when an asymmetric short circuit appears in one of the switching cells, at time t=15 ms. It is assumed that it is the cell that outputs I1 and that asymmetry is due to the fact that one of the switches is short circuited and the other is simultaneously open. FIG. 4A shows the free signature of the fault in the form of an intermittent single alternating short circuit condition with a ratio of maximum and nominal currents Imax/Inom equal to 15.

Figure 4C:
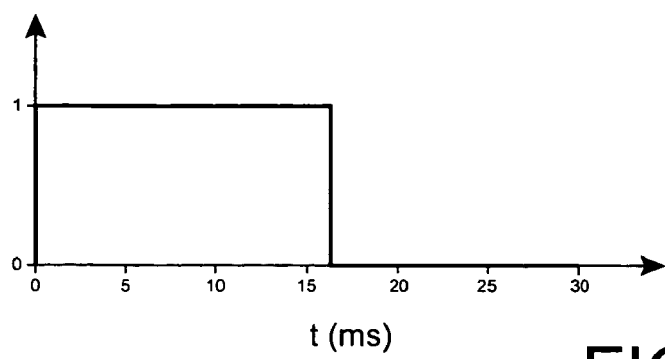

FIG. 4B shows the signature of the same fault followed by activation of the fourth cell and isolation of the defective cell, and therefore the phase concerned, using a thyristor isolating device, regardless of whether the isolating device is connected to the three-phase alternating current source or to the DC voltage source. This isolation takes place as soon as the first current cancellation takes place (time t=17 ms). The graph on FIG. 4C illustrates the turn-off control applied to the thyristors of the isolating device. It can be seen that the ratio of the maximum and nominal currents Imax/Inom is now only equal to 6.

Several reconfiguration types are possible after a failure has been detected in one or two switching cells.

Figure 5A:
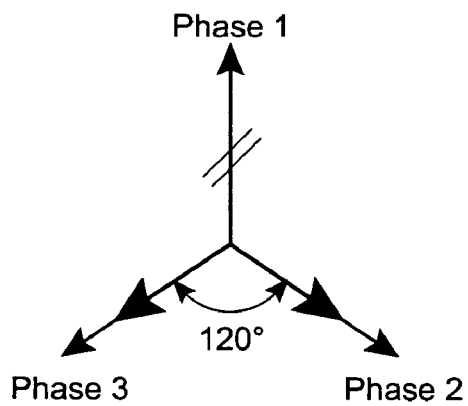
FIGS. 5A to 5D show the equivalent vector diagrams of the different post-failure configurations of the voltage inverter according to the invention.
Figure 5B:
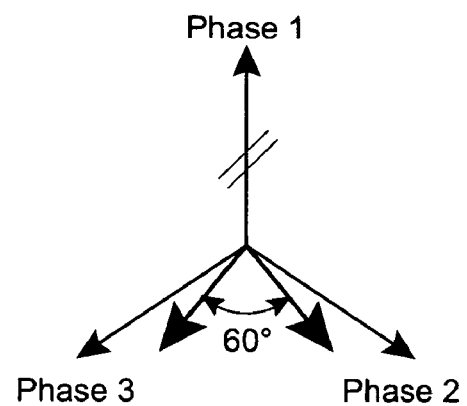
Figure 5C:
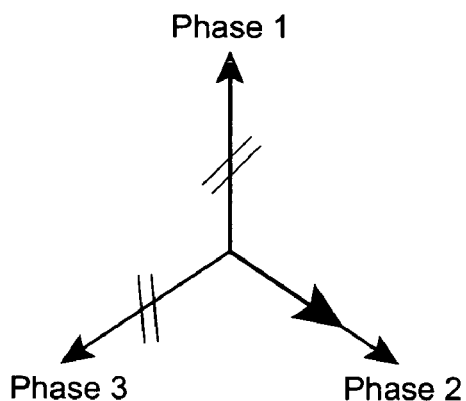

FIGS. 5A, 5B, 5C illustrate equivalent vector diagrams of configurations adopted after the occurrence of a failure of one or two switching cells. The standby cell may be one of the defective cells.

When one of the switching cells other than the standby cell fails, the inverter may operated in two phases after the failure with a phase shift between the two phases equal to 120° as shown on FIG. 5A, or 60° as shown on FIG. 5B. The first configuration maximizes the average power at the detriment of a large fluctuating power. Conversely, the second configuration offers zero fluctuating power at the detriment of a lower average power. In both cases, the standby cell returns two-phase phase currents through the neutral of the alternating current source at an average voltage close to the half voltage of the DC voltage source. A slight current modulation in this standby cell would be possible.

When two switching cells other than the standby cell fail, the inverter operates in single-phase operation between one phase and the neutral of the alternating current source (FIG. 5C). The phase current in the alternating current source circulates in the neutral and into the standby cell.

Figure 5D:
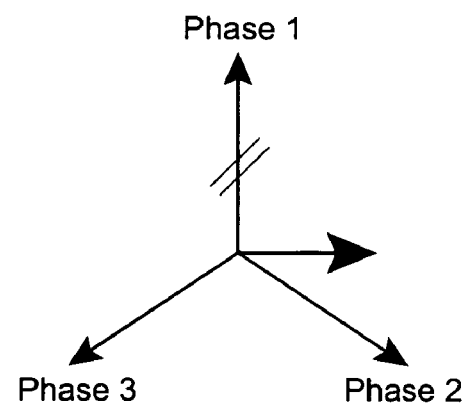

When a failure occurs in two switching cells including the standby cell, all that is possible is single-phase inter-phase operation (between the two remaining phases) or two-phase operation. Refer to FIG. 5D.

The previous description highlights the advantage of a two-phase mode configuration with a phase shift of 60° at zero or practically zero fluctuating power within the framework of mission continuity after failure and isolation of a cell of the inverter. Several operating possibilities are possible after the failure. Operation at low average power results in a reduction of static or dynamic performances of the AC current source. On the other hand, if dynamic performances are to be maintained, the intensity of stator currents in two-phase mode with a phase shift of 60°0 must be greater than for operation in three-phase mode.

FIGS. 6A to 6D show simulation of a changeover from three-phase mode to two-phase standby mode with a phase shift of 60°.

Figure 6A:
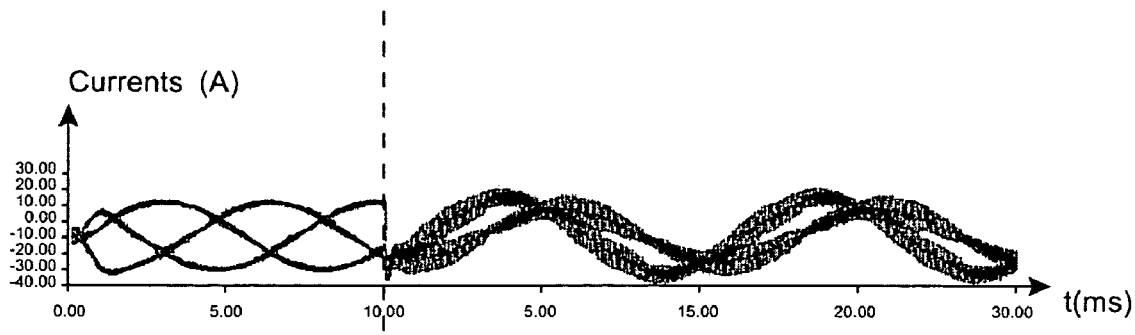
FIGS. 6A to 6D show different characteristics of the inverter or the AC current source that it supplies when changing from three-phase mode to two-phase standby mode with a phase shift of 60°.

FIG. 6A shows currents output by the inverter according to the invention to the alternating source that is assumed to be a synchronous motor with permanent magnets. During normal operation, these currents are three-phase currents. As soon as the failure appears in any one of the switching cells, the inverter changes to standby mode and outputs two-phase currents with a phase shift of 60°.

Figure 6B:
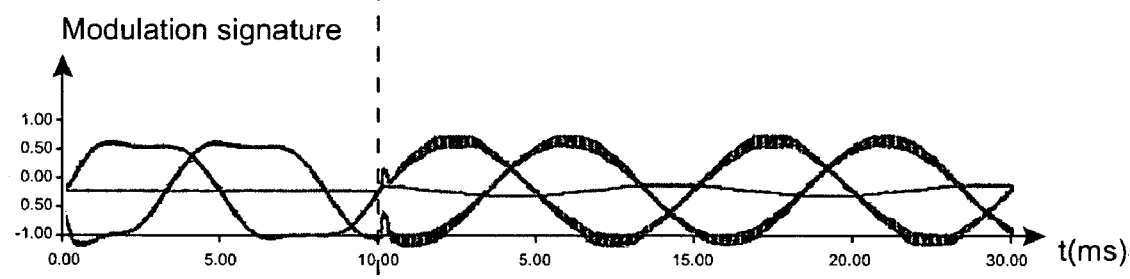

FIG. 6B shows the modulation signature of two active cells of the inverter and the standby cell before the appearance of the failure of the third cell and after it appeared when the reconfiguration has taken place. The two cells concerned are the cells that remain active after the failure occurs.

Figure 6C:
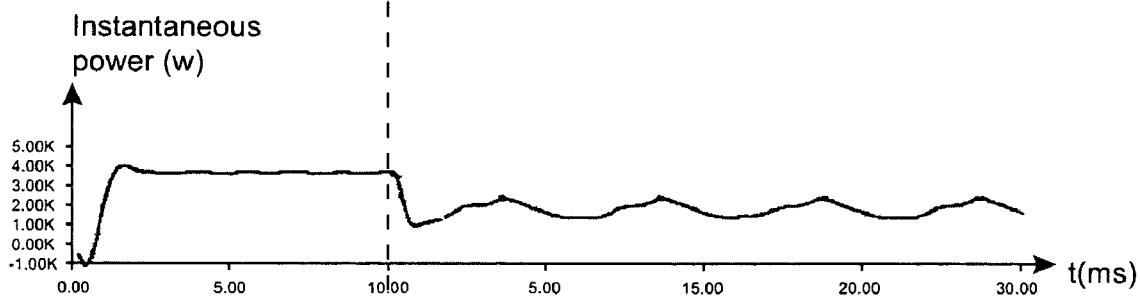

FIG. 6C shows the instantaneous power output to the alternating current source by the inverter. This power is reduced after the reconfiguration when the amplitude of the phase currents remains similar.

Figure 6D:
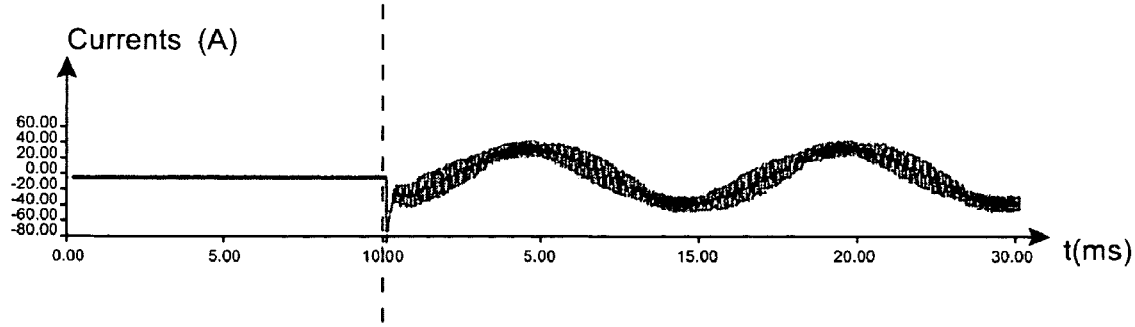

FIG. 6D illustrates the current circulating in the standby cell during the same time range. The standby-cell is waiting before the failure appears, and becomes active after reconfiguration.

In conclusion, the voltage inverter according to the invention is tolerant to failures, it is capable of detecting and isolating one or several internal failures. It can maintain its initial functions despite the presence of these failures, provided that the connection of the energy sources with which it cooperates and control over its switching sources are reconfigured. Such a three-phase voltage inverter has better internal safety and functional availability than conventional voltage inverters.

Although several embodiments of this invention have been shown and described in detail, it will be understood that various changes and modifications could be made without departing from the scope of the invention.

DOCUMENTS MENTIONED

[1] "Fault Tolerant Three-phase Ac Motor Drive Topologies: A Comparison of Features, Cost and Limitations", Brian A. Welchko et al., IEEE Transactions on Power Electronics, Vol 19, No. 4, July 2004, pages 1108-1116.

[2] "Experimental Fault-Tolerant Control of a PMSM Drive", Silverio Bolognani et al. IEEE Transactions on Power Electronics, Vol 47, No. 5, October 2000, pages 1134-1141.

[3] "A Strategy for Improving Reliability of motor Drive Systems Using a Four-leg Three-Phase Converter", R. L. A Ribeiro, Applied Power Electronics Conference (APEC 2001), Vol 1, 4-8 March 2001, pages 385-391.

The invention claimed is:

1. Voltage inverter provided with four switching cells (Q1 to Q4) to be connected to the terminals of a DC voltage source (Vdc), each comprising two semiconductor switches (I11, I12, I21, I22, I31, I32, I41, I42) installed in series, these switches having a common point (A0) to be connected to an AC current source (Mac) with three phases (p1, p2, p3) and a neutral (n), the connection being made onto one phase (p1, p2, p3) for three of the cells (Q1, Q2, Q3) and onto the neutral (n) for the fourth cell (Q4), wherein each of the four cells (Q1 to Q4) cooperates with a semiconductor electrical isolating device (S1, (S2.1 and S2.2)) to be put into a turn-off state if the cell should fail, this isolating device (S1, (S2.1 and S2.2)) being arranged either on the connection to the AC current source (Mac), or on connections to the terminals of the DC voltage source (Vdc).

2. Voltage inverter according to claim 1, wherein the electrical isolating device has a controllable electronic switch function that is bi-directional in current and in voltage.

3. Voltage inverter according to claim 1, wherein, when the electrical isolating device (S1) is arranged on the connection to the AC current source (Mac), said electrical isolating device (S1) comprises at least two parts (I'11, I'12) in an antiparallel circuit.

4. Voltage inverter according to claim 3, wherein each part comprises a diode (D1', D2') and a transistor (T2', T1') in series.

5. Voltage inverter according to claim 3, wherein each part comprises a thyristor (Th1, Th2).

6. Voltage inverter according to claim 1, wherein when the electrical isolating device (S2.1 and S2.2) is arranged on the connections to the terminals of the DC voltage source (Vdc), the electrical isolating device (S2.1, S2.2) includes at least two thyristors (Th1', Th2') installed in antiparallel on each connection.

7. Voltage inverter according to claim 1, wherein when the electrical isolating device (S2.1 and S2.2) is arranged on the connections to the terminals of the DC voltage source (Vdc), the electrical isolating device (S2.1, S2.2) includes at least one diode (D1", D2") and a thyristor (Th1", Th2") installed in antiparallel on each connection.

8. Voltage inverter according to claim 1, wherein when the electrical isolating device (S2.1 and S2.2) is arranged on the connections to the terminals of the DC voltage source (Vdc), the electrical isolating device (S2.1, S2.2) includes at least one diode (D1", D2") and one transistor (T1, T2) installed in antiparallel on each connection.

9. Voltage inverter according to claim 1, wherein when the electrical isolating device (S2.1 and S2.2) is arranged on the connections to the terminals of the DC voltage source (Vdc), the electrical isolating device (S2.1, S2.2) includes at least two assemblies each having one diode (D1, D2) and one transistor (T1, T2) installed in series, on each connection, these two assemblies being mounted in antiparallel.

10. Voltage inverter according to claim 1, wherein a protection device (Pi', Pi") cooperates with the electrical isolating device (S1, (S2.1 and S2.2)).

11. Voltage inverter according to claim 10, wherein the protection device (Pi') comprises at least one transit diode (DT') in parallel with the electrical isolating device (S1).

12. Voltage inverter according to claim 6, wherein a thyristor (Th1', Th2', Th1", Th2") or a transistor (T10, T1) of the electrical isolating device (S2.1, S2.2) is mounted in series with a filter device (L C).

13. Voltage inverter according to claim 12, wherein the filter device (LC) is of the inductive capacitive type.

14. Voltage inverter according to claim 1, wherein the switch (I11, I12, I21, I22, I31, I32, I41, I42) comprises a transistor (T) and a diode (D) in an antiparallel circuit.

15. Voltage inverter according to claim 1, wherein the switch (I11, I12, I21, I22, I31, I32, I41, I42) is provided with a protection device (Pi).

16. Voltage inverter according to claim 1, wherein each switching cell (Q1 to Q4) cooperates with a failure monitoring and control device (S0) specific to it.

17. Voltage inverter according to claim 16, wherein when the monitoring and control device (S0) detects failure of one (Q1, Q2, Q3) of the three cells (Q1 to Q3), it forces the switches (I11, I12, I21, I22, I31, I32, I41, I42) of this cell and the electrical isolating device (S1, S2.1, S2.2) associated with it into a turn-off state.

18. Voltage inverter according to claim 17, including a supervisor device (OS), wherein when the monitoring and control device (S0) detects failure of one (Q1, Q2, Q3) of the three cells (Q1 to Q3), the supervisor device (OS) puts the fourth cell (Q4) into operation and puts the electrical isolating device (S1, (S2.1, S2.2)) associated with the fourth cell (Q4) into a turn-on state.

19. Voltage inverter according to claim 16, wherein the monitoring and control device (S0) cooperates with a current measurement device (Mi) placed on the connection to the alternating current source (Mac).

20. Voltage inverter according to claim 16, wherein the monitoring and control device (S0) cooperates with a device for measuring the temperature of the switches (I11, I12, I21, I22, I31, I32, I41, I42).

* * * * *